(12) United States Patent
Kwok et al.

(10) Patent No.: US 12,720,426 B2
(45) Date of Patent: Aug. 25, 2026

(54) CARRIER AGGREGATION CONFIGURATION BASED ON POWER HEADROOM REPORT

(71) Applicant: T-Mobile USA, Inc., Bellevue, WA (US)

(72) Inventors: Ming Shan Kwok, Seattle, WA (US); Wafik Abdel Shahid, Kenmore, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 611 days.

(21) Appl. No.: 18/072,481

(22) Filed: Nov. 30, 2022

(65) Prior Publication Data

US 2024/0179622 A1 May 30, 2024

(51) Int. Cl.
*H04W 48/20* (2009.01)
*H04W 52/36* (2009.01)

(52) U.S. Cl.
CPC ......... *H04W 48/20* (2013.01); *H04W 52/365* (2013.01)

(58) Field of Classification Search
CPC ............................ H04W 48/20; H04W 52/365
See application file for complete search history.

(56) References Cited

U.S. PATENT DOCUMENTS 10,986,584 B2 4/2021 Jazi
11,317,359 B2 4/2022 Nangia
2015/0351053 A1 12/2015 Jeong
2017/0094612 A1* 3/2017 Dinan ................. H04W 52/242
2018/0213452 A1* 7/2018 Kim ...................... H04L 5/0007
2019/0208510 A1* 7/2019 Park ...................... H04W 52/34
2021/0218904 A1 7/2021 Turcotte

OTHER PUBLICATIONS

3GPP, "Medium Access Control (MAC) protocol specification", TS 38,321, v 16.8.0, release 16, available at <<https://cdn.standards.iteh.ai/samples/66123/1631ea3f3eef4a35a0c2bdf328529d98/ETSI-TS-138-321-V16-8-0-2022-05-.pdf>>, May 2022, 161 pages.

* cited by examiner

*Primary Examiner* — Nizam U Ahmed
(74) *Attorney, Agent, or Firm* — Lee & Hayes, P.C.

(57) ABSTRACT

A user equipment (UE) can use carrier aggregation to connect to different cells provided by one or more base stations of a telecommunication network. One of the cells can be a primary cell (PCell), while another cell can be a secondary cell (SCell). The UE can send a power headroom report (PHR) that includes both a PCell power headroom indicating an available transmission power associated with the PCell, and an SCell power headroom indicating an available transmission power associated with the SCell. If the SCell power headroom is greater than the PCell power headroom, indicating that the UE has more available transmission power in association with the current SCell that may lead to improved metrics, a scheduler associated with the one or more base stations can send cell swap instructions to switch which cells the UE uses as the PCell and the SCell for carrier aggregation.

20 Claims, 5 Drawing Sheets

CARRIER AGGREGATION CONFIGURATION BASED ON POWER HEADROOM REPORT

BACKGROUND

In a telecommunication network, a user equipment (UE) can wirelessly connect to one or more base stations in order to engage in voice calls, video calls, data transfers, or other types of communications. For example, a mobile device, such as a smart phone, can wirelessly connect to one or more gNBs or other base stations of a radio access network (RAN) to access the telecommunication network.

In some examples, when a UE is connected to the telecommunication network, carrier aggregation can allow the UE to send and/or receive data via multiple carriers. Different carriers can be associated with different frequencies, such as different frequencies in the same frequency band or in different frequency bands. For example, the UE can connect to a primary cell of the telecommunication network via a first carrier, and also connect to a secondary cell of the telecommunication network via a second carrier, such that the UE can send and/or receive data via both the first carrier and the second carrier.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
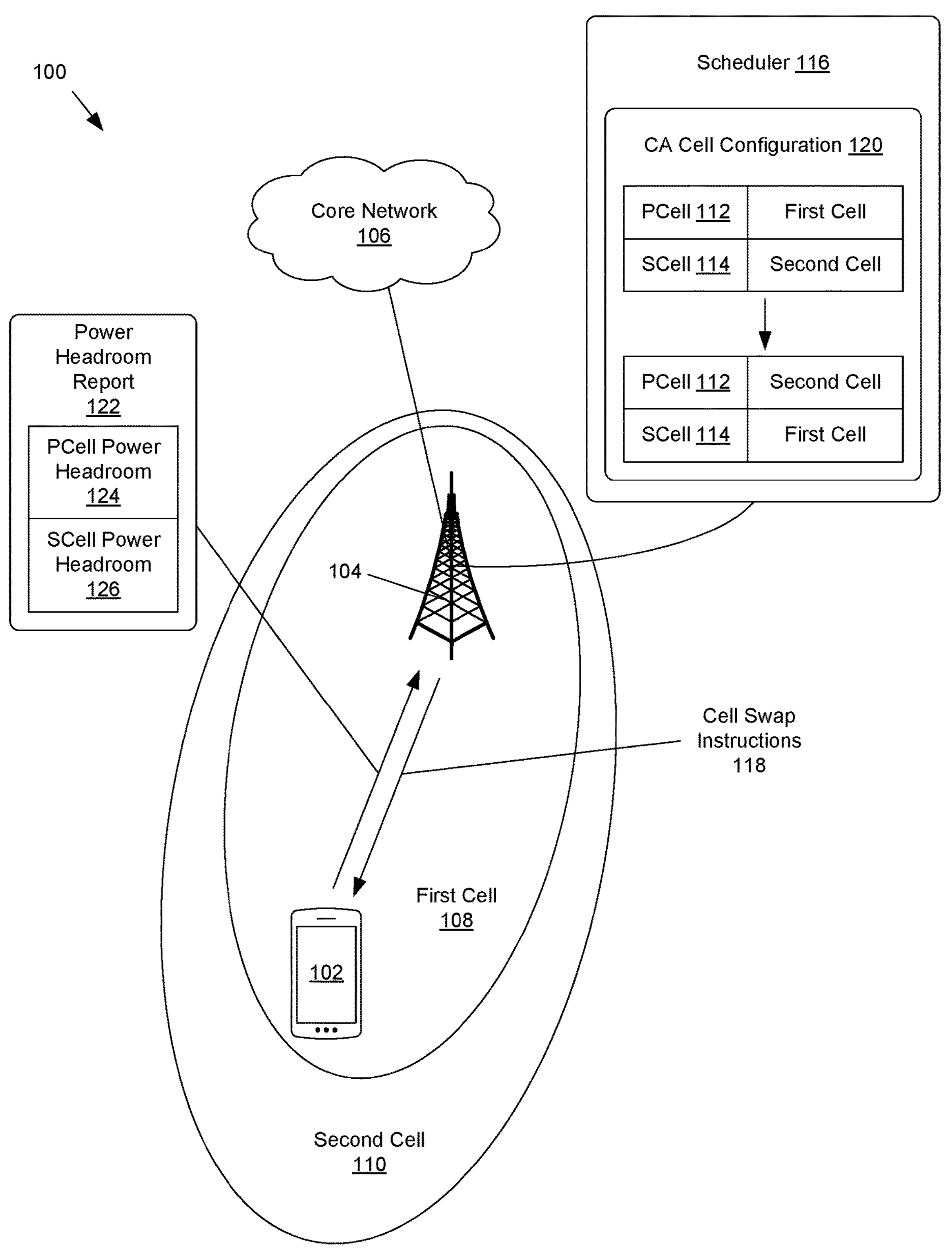
FIG. 1 shows an example of a network environment in which a UE can connect to a telecommunication network via at least one base station.

A UE can wirelessly connect to at least one base station of a telecommunication network, such as a gNB of a fifth generation (5G) New Radio (NR) radio access network. When connected to a base station, the UE can send uplink data to the base station and receive downlink data from the base station.

UEs and base stations can support carrier aggregation, such as uplink carrier aggregation and/or downlink carrier aggregation. During carrier aggregation transmissions, a UE and one or more base stations can use multiple component carriers associated with one or more frequency bands to exchange data. As an example, a UE can send uplink data to a base station via a first component carrier associated with a primary cell (PCell) provided by the base station, as well as via a second component carrier associated with a secondary cell (SCell) provided by the base station. In other examples, the PCell and the SCell can be provided by different base stations.

In some situations, a base station can cause the UE to change which cells are used as the PCell and as one or more SCells for carrier aggregation. For example, if data can be transferred via a current SCell more quickly than via the current PCell, a scheduler associated with a base station may swap the cells so that the UE uses the former SCell as the PCell, and uses the former PCell as an SCell. However, it can be difficult to determine when a swap between a PCell and an SCell should occur.

For example, some base stations may be configured to only evaluate downlink transmission metrics to determine when a PCell and an SCell should be swapped, and are not configured to consider uplink transmission metrics. Accordingly, if uplink transmission metrics are relatively poor, but downlink transmission metrics meet acceptable thresholds, such base stations may determine not to swap a PCell and an SCell even if switching the PCell and the SCell could result in improved uplink transmission performance.

As another example, the UE can be configured to submit a power headroom report (PHR) to a base station that includes a power headroom value including how much transmission power the UE has available, beyond power being used for current transmissions. However, in many existing systems, a PHR sent by a UE only indicates a power headroom value associated with a PCell. Accordingly, a base station may not receive information from the UE indicating power headroom values associated with both a PCell and an SCell, and may therefore be unable to determine based on an SCell power headroom value whether the UE should switch to using a corresponding SCell as the PCell.

The systems and methods described herein allow a base station to adjust a carrier aggregation configuration for a UE based on a PHR that includes power headroom values associated with both a PCell and an SCell. The UE can send a PHR to the base station that indicates a PCell power headroom associated with a current PCell and an SCell power headroom associated with a current SCell. If the PHR indicates that the SCell power headroom is greater than the PCell power headroom, the base station may determine that the current SCell could provide improved performance and/or an improved user experience, for instance via higher uplink throughput and/or more efficient spectrum usage, relative to the current PCell. Accordingly, the base station may instruct the UE to use the current SCell as the PCell, and to use the current PCell as an SCell.

Example Environment

FIG. 1 shows an example 100 of a network environment in which a UE 102 can connect to a telecommunication network via at least one base station 104. When the UE 102 connects to the telecommunication network, the UE 102 can engage in communication sessions for voice calls, video calls, messaging, data transfers, and/or any other type of communication via the telecommunication network. As described further below, the UE 102 and one or more base stations 104 can use carrier aggregation to transmit uplink and/or downlink transmissions via multiple component carriers associated with corresponding cells provided by the one or more base stations 104.

The UE 102 can be any device that can wirelessly connect to one or more base stations 104. In some examples, the UE 102 can be a mobile phone, such as a smart phone or other cellular phone. In other examples, the UE 102 can be a personal digital assistant (PDA), a media player, a tablet computer, a gaming device, a smart watch, a hotspot, an Internet of Things (IoT) device, a personal computer (PC) such as a laptop, desktop, or workstation, or any other type of computing or communication device.

The base stations 104 can be part of an access network of the telecommunication network, such as a radio access network (RAN). The telecommunication network can also have a core network 106 linked to the access network. The UE 102 can wirelessly connect to one or more base stations 104 of the access network, and in turn be connected to the core network 106 via the base stations 104. The core network 106 can also link the UE 102 to an Internet Protocol (IP) Multimedia Subsystem (IMS), the Internet, and/or other networks.

The UE 102 and elements of the telecommunication network, such as the base stations 104, other elements of the access network, and/or the core network 106, can be compatible with one or more radio access technologies, wireless access technologies, protocols, and/or standards. For example, the UE 102, the base stations 104, and/or the core network 106 can support 5G NR technology, Long-Term Evolution (LTE)/LTE Advanced technology, other fourth generation (4G) technology, High-Speed Data Packet Access (HSDPA)/Evolved High-Speed Packet Access (HSPA+) technology, Universal Mobile Telecommunications System (UMTS) technology, Code Division Multiple Access (CDMA) technology, Global System for Mobile Communications (GSM) technology, WiMax® technology, WiFi® technology, and/or any other previous or future generation of radio access technology.

As an example, a base station 104 can be a gNB of a 5G access network. As another example, the access network can be an LTE access network, known as an Evolved UMTS Terrestrial Radio Access Network (E-UTRAN), and a base station 104 can be an evolved Node B (eNB) of the LTE access network. The core network 106 can also be based on LTE or 5G. For instance, the core network 106 can be a 5G core network or an LTE packet core network known as an Evolved Packet Core (EPC). A base station 104 and the core network 106 may be based on the same radio access technology, or different radio access technologies. For instance, in some examples a base station 104 can be a 5G gNB that is linked to an LTE core network and/or a 5G core network.

The UE 102 can transmit data to, and/or receive data from, one or more base stations 104. For example, the UE 102 can receive downlink transmissions from a base station 104, for instance to download data, receive voice and/or video data during calls, and/or receive any other type of data. As another example, the UE 102 can send uplink transmissions to a base station 104 to upload data, submit requests for services, transmit voice and/or video data during calls, and/or to transmit any other type of data from the UE 102 to the base station 104, the core network 106, an IMS, the Internet, and/or other networks.

In some examples, the UE 102 can have multiple antennas, such that the UE 102 can use multiple-input multiple-output (MIMO) techniques to exchange data with one or more base stations 104 via different antennas. For example, the UE 102 can have a 2×2 MIMO configuration with two transmitter antennas and two receiver antennas, a 4×4 MIMO system with four transmitter antennas and four receiver antennas, or any other MIMO system.

The UE 102 and the base stations 104 can support one or more frequency bands. Accordingly, the UE 102 can wirelessly connect to a base station 104 using one or more frequency bands supported by both the UE 102 and the base station 104. Such frequency bands can include low bands, mid-band, and/or high bands. For instance, low bands can be associated with frequencies under 1 GHz, mid-bands can be associated with frequencies between 1 GHz and 6 GHz, and high bands can be associated with frequencies above 6 GHz, such as millimeter wave (mmW) frequencies above 24 GHz. As an example, 5G NR spectrum can include low bands, mid-bands, and mmW bands such as:

| Band | Shorthand Frequency (MHz) | Uplink Band (MHz) | Downlink Band (MHz) |
|---|---|---|---|
| n2 (Mid-Band) | 1900 | 1850-1910 | 1930-1990 |
| n12 (Low Band) | 700 | 699-716 | 729-746 |
| n25 (Mid-Band) | 1900 | 1850-1915 | 1930-1995 |
| n41 (Mid-Band) | 2500 | 2496-2690 | 2496-2690 |
| n66 (Mid-Band) | 1700 | 1710-1780 | 2110-2200 |
| n71 (Low Band) | 600 | 663-698 | 617-652 |
| n260 (mmW) | 39000 (39 GHz) | 37000-40000 | 37000-40000 |
| n261 (mmW) | 28000 (28 GHz) | 27500-28350 | 27500-28350 |

Frequencies in different bands may have different properties. For example, lower-frequency signals can often propagate over larger distances than higher-frequency signals, and may be able to better penetrate through objects than higher-frequency signals. However, higher-frequency signals can often be used to transmit data more quickly than lower-frequency signals.

One or more base stations 104 can provide different cells to which the UE 102 and/or other UEs can connect. For example, one or more base stations 104 can provide a first cell 108, a second cell 110, and/or other cells. Different cells can be associated with different frequencies and/or different frequency bands.

As a non-limiting example, the first cell 108 may be associated with frequencies in the n41 mid-band, while the second cell 110 may be associated with frequencies in the n71 low band. As discussed above, signals at different frequencies may propagate over different distances, such that different cells may cover different geographic areas. For instance, in the above example in which the first cell 108 is associated with the n41 mid-band and the second cell 110 is associated with lower frequencies in the n71 low band, the second cell 110 may cover a larger geographic area than the first cell 108.

In some examples, the same base station 104 can provide multiple cells, such as the first cell 108 and the second cell 110 as shown in FIG. 1. In other examples, different base stations 104 can provide different cells. For example, a first base station 104 at a first geographic location can provide the first cell 108, while a second base station 104 at a second geographic location can provide the second cell 110.

As shown in FIG. 1, the UE 102 may be at a location that is covered by both the first cell 108 and the second cell 110. For example, the UE 102 can be at a location that is near a cell edge of the first cell 108, and that is near a mid-cell position within the second cell 110. Accordingly, the UE 102 can send and/or receive data in association with either, or both, the first cell 108 and the second cell 110.

The UE 102 and one or more base stations 104 can use carrier aggregation (CA) to transmit data during uplink and/or downlink transmissions via multiple component carriers. By transmitting data via multiple component carriers, carrier aggregation can increase bandwidth, increase throughput, and/or result in other benefits relative to transmitting data via a single carrier. The component carriers can be centered at frequencies within one or more frequency bands. For instance, the component carriers can span a contiguous range of frequencies in a single frequency band, be at non-contiguous frequency ranges in a single frequency band, or be at frequency ranges in multiple frequency bands.

The frequencies associated with different component carriers can also be associated with different cells, such as the first cell 108 and the second cell 110 shown in FIG. 1. For example, the UE 102 can use a first component carrier to transmit uplink data in association with the first cell 108, and can also use a second component carrier to transmit uplink data in association with the second cell 110. As discussed above, the first cell 108 and the second cell 110 may be provided by the same base station 104, or by different base station 104. Accordingly, carrier aggregation for the UE 102 may be associated with cells provided by the same base station 104, or with cells provided by different base stations 104.

One of the cells to which the UE 102 is connected can be designated as a primary cell (PCell) 112 for carrier aggregation between the UE 102 and one or more base stations 104, while one or more other cells to which the UE 102 is connected can be designated as secondary cells (SCells) 114 for the carrier aggregation. The PCell 112 can be associated with a primary component carrier, and the SCells 114 can be associated with secondary component carriers. User plane data can be transported via the component carriers associated with the PCell 112 and the SCells 114. Control plane data, such as Radio Resource Control (RRC) messages, Non-Access Stratum (NAS) messages, and/or other control plane data, can be transported via the primary component carrier associated with the PCell 112. In some examples, the primary component carrier associated with the PCell 112 may remain active constantly, while one or more secondary component carriers associated with SCells 114 can be activated and/or deactivated in different situations.

In some examples, the same cell may be the PCell 112 for the UE 102 in association with both uplink CA transmissions and downlink CA transmissions. However, in other examples, one cell may be the PCell 112 for uplink CA transmissions from the UE 102, while another cell may be the PCell 112 for downlink CA transmissions to the UE 102. As an example, the first cell 108 may be the PCell 112 for uplink CA transmissions from the UE 102 at a particular time, while at the same time the second cell 110 may be the PCell for downlink CA transmissions to the UE 102.

In some situations, the PCell 112 can be a cell that the UE 102 initially detects and uses to establish a connection to a base station 104. The UE 102 can then additionally connect to one or more SCells 114, such that the UE 102 is connected to the PCell 112 and one or more SCells 114 for carrier aggregation. As an example, if the UE 102 connects to the first cell 108 before the second cell 110, the first cell 108 can initially be the PCell 112 for the UE 102, and the second cell 110 may initially be an SCell 114 for the UE 102.

However, a scheduler 116 associated with at least one base station 104 and/or the access network can be configured to control which cells are used by the UE 102 as the PCell 112 and as one or more SCells 114 for uplink and/or downlink carrier aggregation. The scheduler 116 can, in some examples, be associated with the current PCell 112 for the UE 102. If the scheduler 116 determines that a cell currently being used as an SCell 114 for the UE 102 may offer improved performance and/or user experience in association with the UE 102 relative to the cell currently being used as the PCell 112 for the UE 102, the scheduler 116 can send cell swap instructions 118 to the UE 102.

The cell swap instructions 118 can cause the UE 102 to switch the cells being used as the PCell 112 and the SCell 114, such that the current SCell 114 becomes the PCell 112 and the current PCell 112 becomes an SCell 114. The cell swap instructions 118 can be handover instructions or other types of instructions that cause the UE 102 to change which cells are used as the PCell 112 and as one or more SCells 114 for carrier aggregation. The cell swap instructions 118 can, for example, be an RRC Reconfiguration Message that identifies which cells the UE 102 is to use as the PCell 112 and one or more SCells 114. The cell swap instructions 118 may instruct the UE 102 to change which cells are used as the PCell 112 and one or more SCells 114 for uplink carrier aggregation, for downlink carrier aggregation, or for both uplink and downlink carrier aggregation.

For example, if a secondary component carrier associated with a current SCell 114 for the UE 102 may provide higher throughput and/or bandwidth in uplink or downlink directions than a primary component carrier associated with the current PCell 112, the UE 102 may send cell swap instructions 118 that cause the current SCell 114 to become the PCell 112 for the UE 102 and the current PCell 112 to become an SCell 114 for the UE 102. Accordingly, after a swap between the PCell 112 and the SCell 114 caused by the cell swap instructions 118, a primary component carrier associated with the new PCell 112 may provide higher throughput, higher bandwidth, and/or other benefits relative to the previous primary component carrier associated with the former PCell 112.

The scheduler 116 can be an element of a base station and/or the access network that is configured to manage handover operations associated with the UE 102 and/or other UEs, or otherwise determine which cells the UE 102 and/or other UEs should connect to. As discussed above, the scheduler 116 can be associated with the cell being used by the UE 102 as the PCell 112. The scheduler 116 can also manage uplink and/or downlink carrier aggregation associated with the UE 102, for instance to determine when the UE 102 is to use secondary carriers associated with one or more SCells 114, and/or to adjust which cells are used by the UE 102 as the PCell 112 and as one or more SCells 114 via cell swap instructions 118.

In some examples, the scheduler 116 can also perform other types of operations. For example, the scheduler 116 can allocate resources for uplink and/or downlink transmissions associated with the UE 102, such as Physical Downlink Shared Channel (PDSCH) and/or Physical Uplink Shared Channel (PUSCH) resources. The scheduler 116 can also determine a modulation and coding scheme (MCS) to use for transmissions via a carrier associated with a cell. An MCS can define a number of bits that can be transmitted per symbol. The scheduler 116 can cause different MCSs to be associated to different component carriers associated with different cells. For example, the scheduler 116 may indicate that a primary component carrier associated with the PCell 112 has a different MCS than a secondary component carrier associated with an SCell 114.

The scheduler 116 can maintain a CA cell configuration 120 associated with the UE 102. The CA cell configuration 120 can indicate which cells the UE 102 is using as the PCell 112 and as one or more SCells 114. In some examples, the scheduler 116 can maintain a first CA cell configuration for uplink CA transmissions associated with the UE 102, and a second CA cell configuration for downlink CA transmissions associated with the UE 102. The scheduler 116 can also maintain different CA cell configurations associated with different UEs, such that different UEs may have different combinations of PCells and SCells.

The scheduler 116 can change the CA cell configuration 120 associated with the UE 102 over time. For example, the scheduler 116 can change the CA cell configuration 120 to adjust which cells are used as the PCell 112 and as one or more SCells 114 for the UE 102 as discussed above.

As a non-limiting example, at a first time, the CA cell configuration 120 can indicate that the first cell 108 is the PCell 112 for uplink CA transmissions from the UE 102, and that the second cell 110 is an SCell 114 for uplink CA transmissions from the UE 102. However, at a second time, the scheduler 116 can determine that the PCell 112 and the SCell 114 should be swapped, such that the second cell 110 becomes the PCell 112 for uplink CA transmissions from the UE 102, and the first cell 108 becomes the SCell 114 for uplink CA transmissions from the UE 102. Accordingly, as shown in FIG. 1, the scheduler 116 can adjust the CA cell configuration 120 to indicate that the second cell 110 is the PCell 112 for uplink CA transmissions from the UE 102, and that the first cell 108 is an SCell 114 for uplink CA transmissions from the UE 102. The scheduler 116 can also send corresponding cell swap instructions 118, such as an RRC Reconfiguration Message, that causes the UE 102 to use the second cell 110 as the PCell 112 for uplink CA transmissions and to use the first cell 108 as an SCell 114 for uplink CA transmissions.

The scheduler 116 can determine when the UE 102 is to switch between using cells as the PCell 112 and one or more SCells 114 for uplink and/or downlink carrier aggregation based on a power headroom report (PHR) 122 received from the UE 102. The PHR 122 can include power headroom values for both a PCell power headroom 124 associated with the current PCell 112 and an SCell power headroom 126 for each of the current SCells 114.

The power headroom values can indicate amounts of remaining available transmission power associated with corresponding component carriers. For example, a power headroom value can be a determined by the UE 102 by subtracting an amount of power currently being used for transmissions by the UE 102 from a maximum transmission power of the UE 102, such that the power headroom value indicates the available transmission power remaining to the UE 102. The current amount of power being used for transmissions can, for example, be PUSCH power.

The UE 102 can be configured to periodically or occasionally measure the PCell power headroom 124 and the SCell power headroom 126. For example, for the PCell power headroom 124, the UE 102 can measure the current amount of power being used by the UE 102 for transmissions via a primary component carrier associated with the current PCell 112, and can subtract the current transmission power from a maximum amount of power usable by the UE 102 for transmissions via the primary component carrier associated with the current PCell 112. Similarly, for the SCell power headroom 126, the UE 102 can measure the current amount of power being used by the UE 102 for transmissions via a secondary component carrier associated with a current SCell 114, and can subtract the current transmission power from a maximum amount of power usable by the UE 102 for transmissions via the secondary component carrier associated with the current SCell 114.

The UE 102 can also be configured to periodically or occasionally send the PHR 122 to the base station 104 associated with the scheduler 116, including the measured PCell power headroom 124 and the measured SCell power headroom 126. As a non-limiting example, the UE 102 may be configured to send the PHR 122 to the base station 104 every 30 milliseconds, or at any other interval. As discussed above, the scheduler 116 may be associated with the base station 104 that provides the cell currently used as the PCell 112, such that the UE 102 can send the PHR 122 to the scheduler 16 at the base station 104 associated with the current PCell 112.

The scheduler 116 can be configured to use power headroom values in PHRs to determine how many resource blocks the UE 102 can use in subframes transmitted in association with one or more cells. For example, if the PCell power headroom 124 indicates that the UE 102 has a relatively large amount of available remaining power to transmit data via a primary component carrier associated with the PCell 112, the scheduler 116 may assign additional resource blocks to the UE 102 in association with the PCell 112.

However, as described herein, the scheduler 116 can also use the PHR 122 to determine when the UE 102 should switch between the PCell 112 and an SCell 114 for uplink and/or downlink carrier aggregation. For example, the scheduler 116 can be configured to send cell swap instructions 118 that cause the UE 102 to swap between the current PCell 112 and SCell 114 if the SCell power headroom 126 in the PHR 122 is greater than the PCell power headroom 124 in the PHR 122. The SCell power headroom 126 being greater than the PCell power headroom 124 can indicate, for example, that the UE 102 has more available transmission power in association with the current SCell 114 than the current PCell 112, such that throughput, bandwidth, spectrum efficiency, and/or other metrics may be able to be improved if the UE 102 switches to using the current SCell 114 as the PCell 112.

As a non-limiting example, the UE 102 may initially be using the first cell 108 as the PCell 112 and the second cell 110 as the SCell 114. However, as shown in FIG. 1, the UE 102 may be at a cell edge of the first cell 108, but be near the middle of the second cell 110. In this example, because the UE 102 is at a cell edge of the first cell 108, the UE 102 may be using a relatively large amount of transmission power in association with the first cell 108 (the current PCell 112), and the PCell power headroom 124 indicating remaining available transmission power associated with the current PCell 112 can be relatively low. However, because the UE 102 is near the middle of the second cell 110, the UE 102 may be using a relatively small amount of transmission power in association with the second cell 110 (the current SCell 114), and the SCell power headroom 126 indicating remaining available transmission power associated with the current SCell 114 may be higher than the PCell power headroom 124.

Accordingly, the scheduler 116 may determine, based on the SCell power headroom 126 being higher than the PCell power headroom 124, that the UE 102 should switch to using the second cell 110 as the PCell 112 and to using the first cell 108 as the SCell 114 for uplink and/or downlink carrier aggregation. The scheduler 116 can update the CA cell configuration 120 accordingly, and/or send corresponding cell swap instructions 118 that cause the UE 102 to use the second cell 110 as the PCell 112 and the first cell 108 as the SCell 114 for uplink and/or downlink carrier aggregation.

In this example, because the power headroom associated with the second cell 110 (the new PCell 112) is higher than the power headroom associated with the first cell 108, throughput, bandwidth, spectrum efficiency, and other metrics associated with uplink and/or downlink carrier aggregation can be improved. For instance, due to the higher power headroom associated with the second cell 110 (the new PCell 112), the scheduler 116 associated with the new PCell 112 may be able to assign more resource blocks to the UE 102, cause the UE 102 to use an MCS that allows the transmission of more bits per symbol, adjust MIMO allocations, and/or otherwise adjust resources in association with the second cell 110 (the new PCell 112) that can result in increased throughput, bandwidth, spectrum efficiency, and/or other metrics relative to when the UE was using the first cell 108 as the PCell 112. As an example, when the UE 102 switches to using a new primary component carrier and a new secondary component carrier associated with the new PCell 112 and the new SCell 114 respectively, the scheduler 116 can instruct the UE 102 to use an MCS in association with the new primary component carrier. The MCS can be different from an MCS that had been used with a previous primary component carrier associated with the previous PCell 112, and may allow more bits per symbol to be transmitted via the new primary component carrier than could be transmitted via the previous primary component carrier.

In some examples, the scheduler 116 may consider other radio condition metrics associated with the PCell 112 and/or the SCell 114, instead of or in addition to the PCell power headroom 124 and the SCell power headroom 126 in the PHR 122. Such radio condition metrics can include signal strength measurements, signal quality measurements, and/or other types of metrics or key performance indicators (KPIs) associated with radio conditions between the UE 102 and one or more base stations 104 via the PCell and/or SCell. For example, based on reference signals or other signals received from one or more base stations 104 via the PCell 112 or the SCell 114, the UE 102 can measure one or more types of corresponding radio condition metrics, such as a received signal strength indicator (RSSI), a reference signal received power (RSRP), a reference signal received quality (RSRQ), and/or other measurements. The UE 102 can use such measurements to determine other types of radio condition metrics, such as a signal to noise ratio (SNR), a signal to interference and noise ratio (SINR), a signal to noise and distortion ration (SNDR), a block error rate (BLER), and/or other types of metrics.

The UE 102 may report such radio condition metrics to the scheduler 116 in association with the PCell 112 and/or one or more SCells 114, such that the scheduler 116 can consider the reported radio condition metrics when determining whether to change which cells the UE 102 is using as the PCell 112 and/or the SCells 114. For example, if radio condition metrics associated with downlink transmissions indicate that a current SCell 114 may be associated with lower levels of interference than the current PCell 112, the scheduler 116 may determine to issue cell swap instructions 118 that cause the UE 102 to swap between the current PCell 112 and the current SCell 114.

However, if such radio condition metrics associated with downlink transmissions are meeting acceptable thresholds, or radio condition metrics associated with downlink transmissions with a PCell are better than corresponding radio condition metrics associated with an SCell, the scheduler 116 may nevertheless determine based on the PHR 122 that throughput, bandwidth, spectrum efficiency, and/or other metrics could be improved for uplink and/or downlink transmissions if the UE 102 switches the PCell and the SCell. For example, although metrics associated with downlink transmissions may meet acceptable thresholds, the SCell power headroom 126 being higher than the PCell power headroom 124 can indicate that uplink transmissions may be limited on the current PCell in a manner that may be degrading network performance associated with uplink and downlink transmissions overall. For instance, if usage of spectrum associated with the PCell is degraded in association with uplink transmissions, the usage of the spectrum may also reduce throughput and other metrics associated with downlink transmissions. However, by switching to using the SCell as the new PCell for uplink transmissions, or for both uplink and downlink transmission, overall network performance metrics and/or spectrum usage can be improved.

In some examples, the scheduler 116 can consider radio condition metrics alongside the PCell power headroom 124 and the SCell power headroom 126 in the PHR 122 when determining whether to switch the UE 102 between the PCell 112 and the SCell 114. For instance, if the SCell power headroom 126 is greater than the PCell power headroom 124 in the PHR 122, the scheduler 116 may analyze other radio condition metrics, such SNR metrics, SINR metrics, SNDR metrics, BLER metrics, and/or other metrics to confirm that the scheduler 116 should send cell swap instructions to cause the UE 102 to switch between the PCell 112 and the SCell 114.

As an example, the PHR 122 sent by the UE 102 may indicate that the SCell power headroom 126 is greater than the PCell power headroom 124 as described above. However, the UE 102 may also indicate that a SINR value associated with the SCell 114 is greater than a SINR value associated with the PCell 112. In this example, the scheduler 116 may determine to keep the current CA cell continuation 120, because the SINR values indicate that swapping to using the current SCell 114 as the new PCell 112 may result in higher interference and/or noise associated with a primary component carrier even though the UE 102 has a higher amount transmission power available in association with the current SCell 114.

As described above, the scheduler 116 can be associated with a base station 104 that provides both the first cell 108 and the second cell 110, such that the UE 102 can use carrier aggregation to connect via component carriers associated with both the first cell 108 and the second cell 110. The scheduler 116 of the base station 104 can use the PHR 122 to determine whether to instruct the UE 102 to switch which of the cells provided by the base station 104 is used as the PCell 112 and as the SCell 114 for uplink and/or downlink carrier aggregation as described above.

However, in other examples, the scheduler 116 can be associated with a base station 104 that provides the cell being used as the PCell 112, while a different base station provides the cell being used as the SCell 114. When the scheduler 116 associated with the PCell 112 sends the cell swap instructions 118 to switch which cells the UE 102 uses as the PCell 112 and as the SCell 114 for uplink and/or downlink carrier aggregation, a scheduler 116 associated with the new PCell 112 can take over to receive the PHR 122 from the UE 102 and to determine if and/or when the UE 102 should again switch which cells the UE 102 uses as the PCell 112 and as the SCell 114.

In still other examples, scheduler 116 can also, or alternately, use the PHR 122 to determine whether to instruct the UE 102 to switch primary and secondary cells associated with dual connectivity arrangements. For example, in dual connectivity arrangements, the first cell 108 and the second cell 110 may be provided by different base stations 104 located at different geographical positions. In these examples, the UE 102 may connect to the first cell 108 provided by a first base station 104, and also connect to the second cell 110 provided by a second base station 104, for instance via 5G E-UTRA-NR Dual Connectivity (5G EN-DC) or other dual connectivity techniques. One of the base stations 104 can be a master node associated with the PCell 112, while the other base station 104 can be a secondary node associated with the SCell 114.

In these examples, the UE 102 can send the PHR 122 report to a scheduler 116 at one or both base stations 104, such as at the master node. The PHR 122 can include the PCell power headroom 124 associated with the current master node, and the SCell power headroom 126 associated with the current secondary node. Similar to the operations described above with respect to carrier aggregation, the scheduler 116 can use the PHR 122 to determine whether the current secondary node should become the master node for dual connectivity, and whether the current master node should become the secondary node for dual connectivity. If so, the scheduler 116 can send corresponding cell swap instructions 118 that cause the UE 102 to switch to using the current secondary node as the master node for dual connectivity, and to using the current master node as the secondary node for dual connectivity.

Example Architecture

Figure 2:
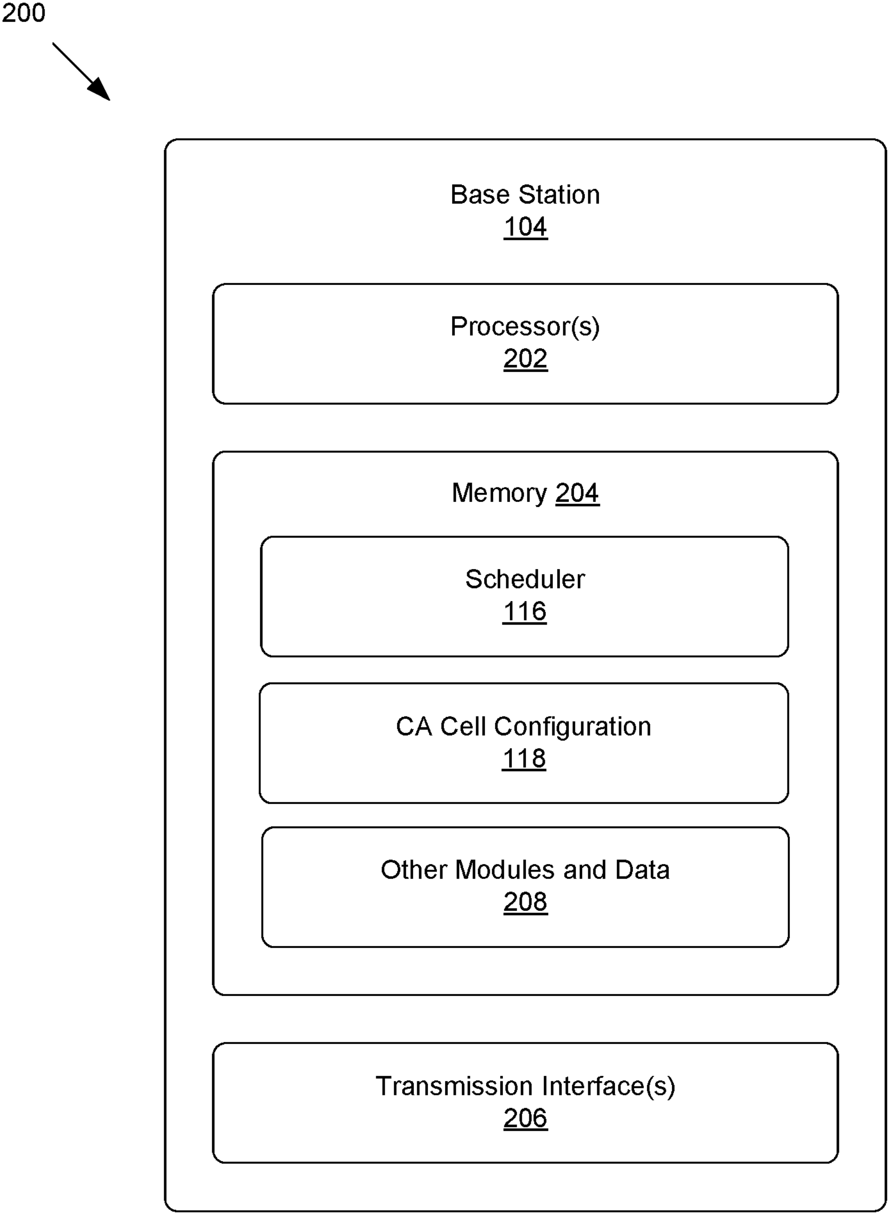
FIG. 2 shows an example of a system architecture for the base station.

FIG. 2 shows an example 200 of a system architecture for a base station 104, in accordance with various examples. As discussed above, the base station 104 can be a 5G gNB. As shown, the base station 104 can include processor(s) 202, memory 204, and transmission interfaces 206.

The processor(s) 202 may be a central processing unit (CPU) or any other type of processing unit. Each of the one or more processor(s) 202 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. The processor(s) 202 may also be responsible for executing all computer-executable instructions and/or computer applications stored in the memory 204.

In various examples, the memory 204 can include system memory, which may be volatile (such as RAM), non-volatile (such as ROM, flash memory, etc.) or some combination of the two. The memory 204 can also include additional data storage devices (removable and/or non-removable) such as, for example, magnetic disks, optical disks, or tape. Memory 204 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, DVD, or other optical storage, magnetic cassettes, magnetic tape, magnetic disk storage or other magnetic storage devices, or any other non-transitory medium which can be used to store the desired information and which can be accessed by the base station 104. Any such non-transitory computer-readable media may be part of the base station 104.

The memory 204 can store computer-readable instructions and/or other data associated with operations of the base station 104. For example, the memory 204 can store computer-readable instructions and/or other data associated with the scheduler 116, such as the CA cell configuration 120. As described herein, the scheduler 116 can determine when the UE 102 is to switch to using a current SCell 114 as the PCell 112 and to using the current PCell 112 as an SCell, for instance based on the PHR 122 received from the UE 102. The scheduler 116 can also cause the base station 104 to send cell swap instructions 118 to the UE 102 when the scheduler 116 determines that the UE 102 is to switch between the PCell 112 and the SCell 114 as described herein. The memory 204 can also store other modules and data 208. The other modules and data 208 can be utilized by the base station 104 to perform or enable performing any action taken by the base station 104. The other modules and data 208 can include a platform, operating system, firmware, and/or applications, and data utilized by the platform, operating system, firmware, and/or applications.

The transmission interfaces 206 can include one or more modems, receivers, transmitters, antennas, error correction units, symbol coders and decoders, processors, chips, application specific integrated circuits (ASICs), programmable circuit (e.g., field programmable gate arrays), firmware components, and/or other components that can establish connections with the UE 102, other base stations 104 or RAN elements, elements of the core network 106, and/or other network elements, and can transmit data over such connections. For example, the transmission interfaces 206 can provide one or more cells, such as the first cell 108 and the second cell 110, and/or can establish one or more connections with the UE 102 over air interfaces. The transmission interfaces 206 can also support transmissions using one or more radio access technologies, such as 5G NR. The transmission interfaces 206 can also be used by the base station 104 to receive the PHR 122 from the UE 102, and to send the cell swap instructions 118 to the UE 102.

Figure 3:
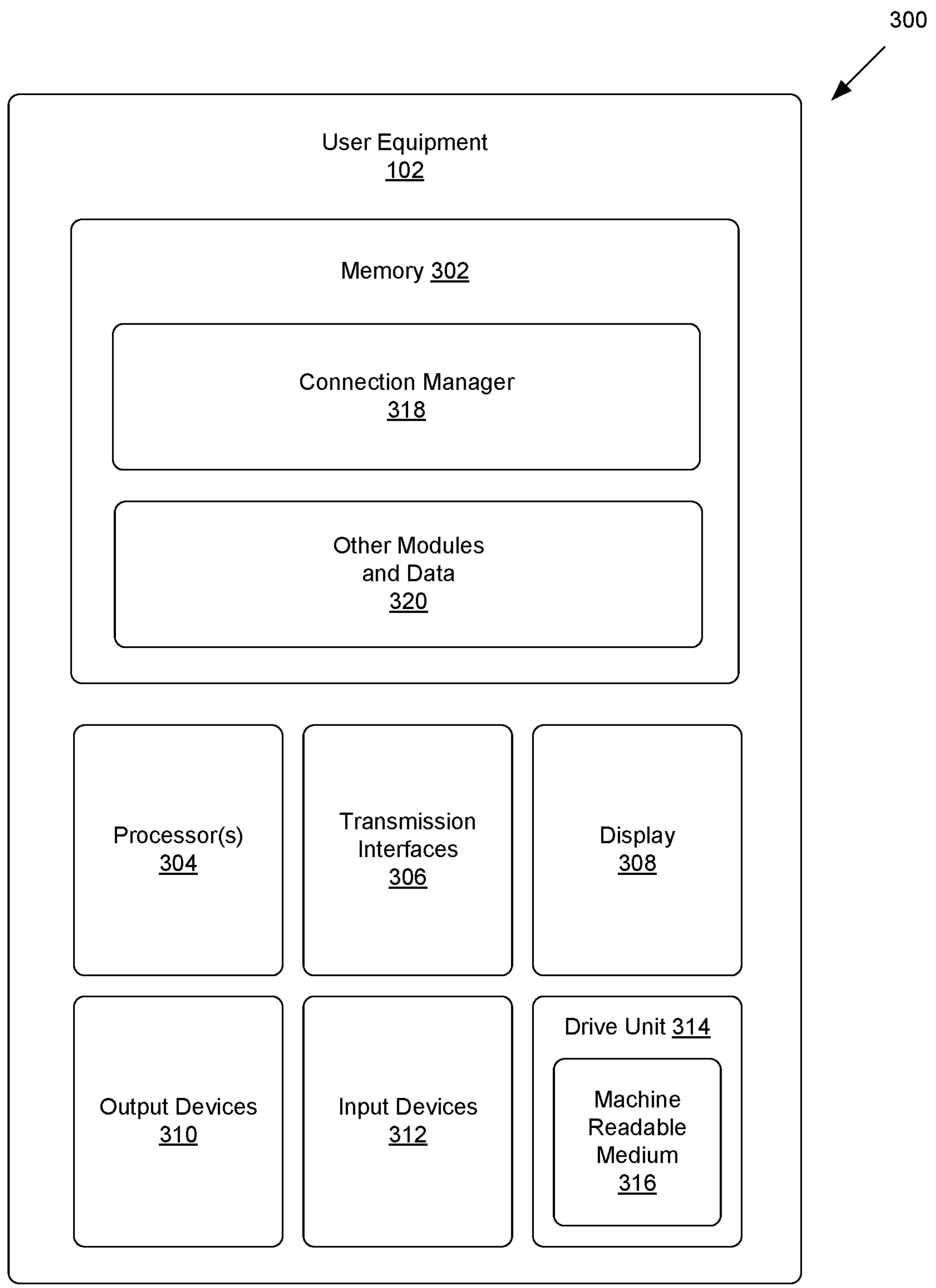
FIG. 3 shows an example of a system architecture for the UE.

FIG. 3 shows an example 300 of a system architecture for the UE 102, in accordance with various examples. The UE 102 can have at least one memory 302, processor(s) 304, transmission interfaces 306, a display 308, output devices 310, input devices 312, and/or a drive unit 314 including a machine readable medium 316.

In various examples, the memory 302 can include system memory, which may be volatile (such as RAM), non-volatile (such as ROM, flash memory, etc.) or some combination of the two. The memory 302 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store the desired information and which can be accessed by the UE 102. Any such non-transitory computer-readable media may be part of the UE 102.

The memory 302 can include one or more software or firmware elements, such as data and/or computer-readable instructions that are executable by the one or more processors 304. For example, the memory 302 can store computer-executable instructions and data associated with a connection manager 318. The connection manager 318 can be configured to establish one or more connections to one or more base stations 104, for example in association with carrier aggregation and/or dual connectivity techniques. The connection manager 318 can also determine which cells provided by one or more base stations 104 are to be used as PCells and SCells for uplink transmissions and/or downlink transmissions, in some examples based on cell swap instructions 118 or other instructions or data received from a base station 104. The connection manager 318 can also be configured to measure, or otherwise determine, the PCell power headroom 124 and the SCell power headroom 126, and to send the PCell power headroom 124 and the SCell power headroom 126 to a base station 104, such as a base station 104 associated with a current PCell, in a PHR 122. The memory 302 can also store other modules and data 320, which can be utilized by the UE 102 to perform or enable performing any action taken by the UE 102. The other modules and data 320 can include a platform, operating system, firmware, and/or applications, and data utilized by the platform, operating system, firmware, and/or applications.

In various examples, the processor(s) 304 can be a CPU, a graphics processing unit (GPU), or both CPU and GPU, or any other type of processing unit. Each of the one or more processor(s) 304 may have numerous ALUs that perform arithmetic and logical operations, as well as one or more CUs that extract instructions and stored content from processor cache memory, and then executes these instructions by calling on the ALUs, as necessary, during program execution. The processor(s) 304 may also be responsible for executing all computer applications stored in the memory 302, which can be associated with types of volatile (RAM) and/or nonvolatile (ROM) memory.

The transmission interfaces 306 can include transceivers, modems, interfaces, antennas, and/or other components that perform or assist in exchanging radio frequency (RF) communications with base stations of the access network, a Wi-Fi access point, or otherwise implement connections with one or more networks. The transmission interfaces 306 can be compatible with one or more radio access technologies, such as 5G NR radio access technologies and/or LTE radio access technologies. The transmission interfaces 306 can be used by the UE 102 to connect to one or more base stations 104, for instance via component carriers associated with the PCell 112 and the SCell 114, to send the PHR 122, and/or to receive the cell swap instructions 118.

The display 308 can be a liquid crystal display or any other type of display commonly used in UEs. For example, the display 308 may be a touch-sensitive display screen, and can thus also act as an input device or keypad, such as for providing a soft-key keyboard, navigation buttons, or any other type of input.

The output devices 310 can include any sort of output devices known in the art, such as the display 308, speakers, a vibrating mechanism, and/or a tactile feedback mechanism. Output devices 310 can also include ports for one or more peripheral devices, such as headphones, peripheral speakers, and/or a peripheral display.

The input devices 312 can include any sort of input devices known in the art. For example, input devices 312 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 316 can store one or more sets of instructions, such as software or firmware, that embodies any one or more of the methodologies or functions described herein. The instructions can also reside, completely or at least partially, within the memory 302, processor(s) 304, and/or transmission interface(s) 306 during execution thereof by the UE 102. The memory 302 and the processor(s) 304 also can constitute machine readable media 316.

Example Operations

Figure 4:
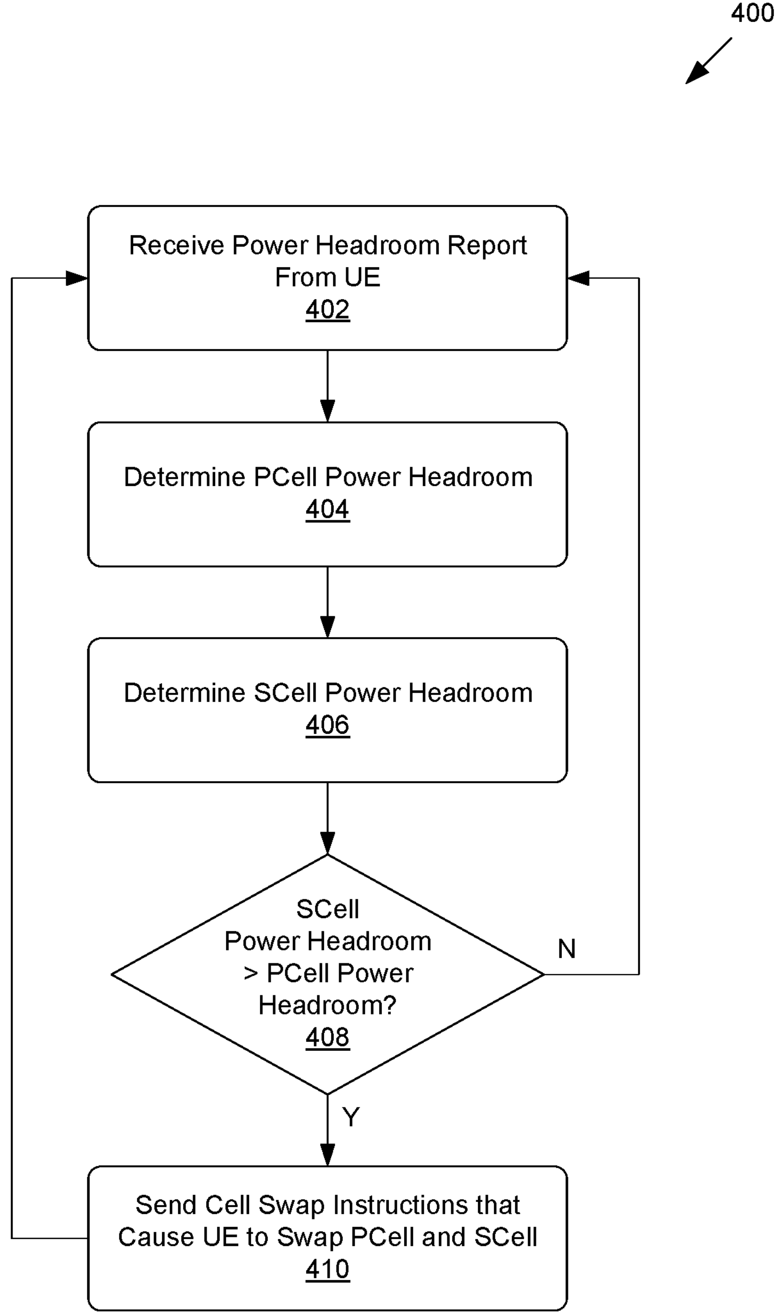
FIG. 4 shows a flowchart of an example method by which a scheduler of a base station can determine whether to cause the UE to switch between a current primary cell (PCell) and a current secondary cell (SCell) for uplink and/or downlink carrier aggregation.

FIG. 4 shows a flowchart of an example method 400 by which a scheduler 116 of a base station 104 can determine whether to cause the UE 102 to switch between a current PCell 112 and a current SCell 114 for uplink and/or downlink carrier aggregation. The UE 102 may initially be using one cell as the PCell 112, and a different cell as the SCell 114. In some examples, the scheduler 116 can be associated with the current PCell 112. The scheduler 116 and/or the base station 104 can use the CA cell configuration 120 to track which cells the UE 102 is using as the PCell 112 and the SCell 114.

At block 402, the scheduler 116 can receive the PHR 122 from the UE 102. As discussed above, the PHR 122 can include the PCell power headroom 124 that indicates the remaining available transmission power associated with the current PCell 112. The PHR 122 can also include the SCell power headroom 126 that indicates the remaining available transmission power associated with the current SCell 114.

In response to receiving the PHR 122 at block 402, the scheduler 116 can determine the PCell power headroom 124 included in the PHR 122 at block 404. The scheduler 116 can determine the SCell power headroom 126 included in the PHR 122 at block 406.

At block 408, the scheduler 116 can determine whether the SCell power headroom 126 is greater than the PCell power headroom 124. If the SCell power headroom 126 is equal to or less than the PCell power headroom 124 (Block 408—No), the scheduler 116 can return to block 402 to receive a subsequent PHR 122 from the UE 102.

However, if the SCell power headroom 126 is greater than the PCell power headroom 124 (Block 408—Yes), the scheduler 116 can determine that the UE 102 should swap between the current PCell 112 and the current SCell 114. For example, because the SCell power headroom 126 is greater than the PCell power headroom 124, switching to using the current SCell (with the higher power headroom value) as the new PCell can lead to improved throughput, bandwidth, spectrum efficiency, and/or other metrics.

Accordingly, at block 410, the scheduler 116 can send cell swap instructions 118 that cause the UE 102 to use the current SCell 114 as the PCell 112, and to use the current PCell 112 as an SCell for uplink and/or downlink carrier aggregation. The scheduler 116 may also update the CA cell configuration 120 to indicate which cells the UE 102 will now be using as the PCell 112 and the SCell 114.

The scheduler 116, or a different scheduler 116 associated with the new PCell 112, can receive a subsequent PHR 122 from the UE 102 at block 402. Based on the subsequent PHR 122, the scheduler 116 can use method 400 to determine whether to swap the PCell and the SCell again. In some examples, the scheduler 116 may be configured to wait thirty seconds, one minute, five minutes, or any other period of time between sending additional cell swap instructions 118 that swap the PCell and the SCell again. However, in other examples, the scheduler 116 may send additional cell swap instructions 118 that swap the PCell and the SCell again at any point based on a subsequent PHR 122 that has a SCell power headroom 126 that is greater than the PCell power headroom 124.

Figure 5:
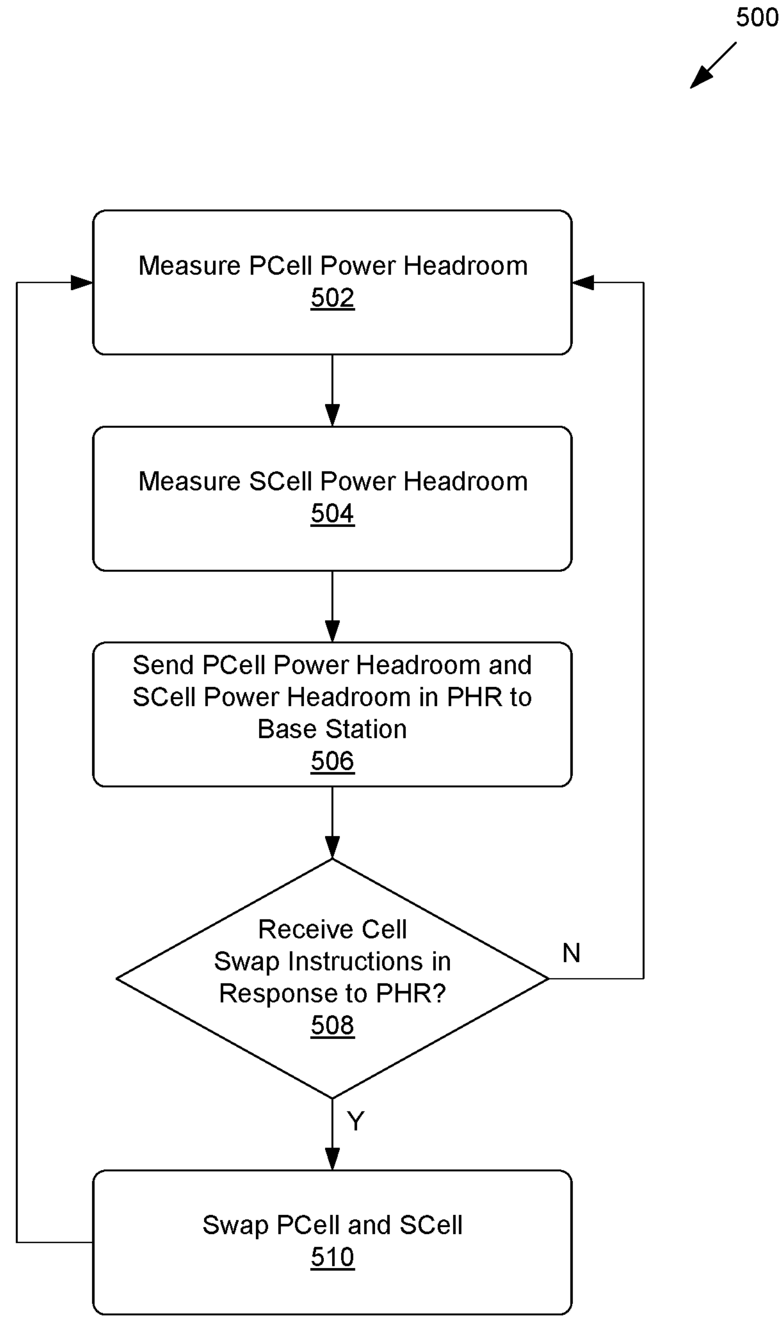
FIG. 5 shows a flowchart of an example method by which the UE can swap between a PCell and an SCell for uplink and/or downlink carrier aggregation.

FIG. 5 shows a flowchart of an example method 500 by which the UE 102 can swap between a PCell 112 and an SCell 114 for uplink and/or downlink carrier aggregation.

The UE 102 may initially be using one cell provided by a base station 104 as the PCell 112, and a different cell provided by the same or a different base station 104 as the SCell 114.

At block 502, the UE 102 can measure the PCell power headroom 124 associated with the current PCell 112. The PCell power headroom 124 can indicate the remaining available transmission power associated with the current PCell 112.

At block 504, the UE 102 can measure the SCell power headroom 126 associated with the current SCell 114. The SCell power headroom 126 can indicate the remaining available transmission power associated with the current SCell 114.

At block 506, the UE 102 can include the PCell power headroom 124 and the SCell power headroom 126 in the PHR 122. The UE 102 can also send the PHR 122 to a base station 104, such as the base station 104 that provides the current PCell 112.

At block 508, the UE 102 can determine whether cell swap instructions 118 have been received from a base station 104, in response to the PHR 122 sent at block 506 or to a previous PHR sent by the UE 102. As discussed above, a scheduler 116 at a base station 104 may send cell swap instructions 118 if the SCell power headroom 126 indicated by a PHR is greater than the PCell power headroom 124 indicated by the PHR. If the UE 102 has not received cell swap instructions (Block 508—No), the UE 102 can return to block 502 to begin measuring a new PCell power headroom 124 and a new SCell power headroom 126 to include in a subsequent PHR 122.

However, if the UE 102 has received cell swap instructions 118 (Block 508—Yes), the UE 102 can follow the cell swap instructions 118 at block 510 to use the current SCell 114 as the PCell 112, and to use the current PCell 112 as an SCell for uplink and/or downlink carrier aggregation. The UE 102 can also return to block 502 to begin measuring a new PCell power headroom 124 associated with the new PCell 112, and a new SCell power headroom 126 associated with the new SCell 114, to include in a subsequent PHR 122.

Conclusion

Although the subject matter has been described in language specific to structural features and/or methodological acts, it is to be understood that the subject matter is not necessarily limited to the specific features or acts described above. Rather, the specific features and acts described above are disclosed as example embodiments.

What is claimed is:

1. A method, comprising: providing, by at least one base station of a telecommunication network, a first cell and a second cell;

receiving, by the at least one base station, a power headroom report (PHR) from a user equipment (UE) connected, via carrier aggregation, to the first cell as a primary cell (PCell) and to the second cell as a secondary cell (SCell), wherein the PHR indicates:

a PCell power headroom associated with the PCell, and an SCell power headroom associated with the SCell;

determining, by the at least one base station based on the PHR, that the SCell power headroom is greater than the PCell power headroom;

receiving, by the at least one base station and from the UE, one or more radio condition metrics that include at least one of one or more signal strength measurements or one or more signal quality measurements between the UE and the at least one base station via at least one of the PCell or the SCell, wherein the one or more radio condition metrics are separate from the PHR; and sending, by the at least one base station in response to determining that the SCell power headroom is greater than the PCell power headroom and based on the one or more radio condition metrics, cell swap instructions to the UE, wherein the cell swap instructions cause the UE to switch to using the second cell as the PCell and to using the first cell as the SCell for the carrier aggregation.

2. The method of claim 1, wherein the cell swap instructions are sent as a Radio Resource Control (RRC) reconfiguration message.

3. The method of claim 1, wherein: the UE connects to the first cell as the PCell via a first primary component carrier and to the second cell as the SCell via a first secondary component carrier, and in response to the cell swap instructions, the UE connects to the second cell as the PCell via a second primary component carrier and to the first cell as the SCell via a second secondary component carrier.

4. The method of claim 3, further comprising instructing, by the at least one base station, the UE to use a modulation and coding scheme (MCS) to increase throughput via the second primary component carrier, wherein the MCS is different from a previous MCS used in association with the first primary component carrier.

5. The method of claim 1, wherein the at least one base station sends the cell swap instructions to the UE based further on the one or more radio condition metrics reported by the UE in addition to the PHR.

6. The method of claim 1, wherein the carrier aggregation is at least one of uplink carrier aggregation or downlink carrier aggregation.

7. The method of claim 1, further comprising updating, by the at least one base station, a carrier aggregation cell configuration tracked by the at least one base station, in associated with the UE, in response to sending the cell swap instructions.

8. One or more base stations of a telecommunication network, comprising:

one or more processors, and memory storing computer-executable instructions that, when executed by the one or more processors, cause the one or more processors to perform operations comprising: providing a first cell;

providing a second cell;

receiving a power headroom report (PHR) from a user equipment (UE) connected, via carrier aggregation, to the first cell as a primary cell (PCell) and to the second cell as a secondary cell (SCell), wherein the PHR indicates: a PCell power headroom associated with the PCell, and an SCell power headroom associated with the SCell;

determining, based on the PHR, that the SCell power headroom is greater than the PCell power headroom;

receiving, from the UE, one or more radio condition metrics that include at least one of one or more signal strength measurements or one or more signal quality measurements between the UE and the one or more base stations via at least one of the PCell or the SCell, wherein the one or more radio condition metrics are separate from the PHR; and sending, in response to determining that the SCell power headroom is greater than the PCell power headroom and based on the one or more radio condition metrics, cell swap instructions to the UE, wherein the cell swap instructions cause the UE to switch to using the second cell as the PCell and to using the first cell as the SCell for the carrier aggregation.

9. The one or more base stations of claim 8, wherein: the UE connects to the first cell as the PCell via a first primary component carrier and to the second cell as the SCell via a first secondary component carrier, and in response to the cell swap instructions, the UE connects to the second cell as the PCell via a second primary component carrier and to the first cell as the SCell via a second secondary component carrier.

10. The one or more base stations of claim 9, wherein the operations further comprise instructing the UE to use a modulation and coding scheme (MCS) to increase throughput via the second primary component carrier, wherein the MCS is different from a previous MCS used in association with the first primary component carrier.

11. The one or more base stations of claim 8, wherein the cell swap instructions are sent to the UE based further on the one or more radio condition metrics reported by the UE in addition to the PHR.

12. The one or more base stations of claim 8, wherein the carrier aggregation is at least one of uplink carrier aggregation or downlink carrier aggregation.

13. The one or more base stations of claim 8, wherein the operations further comprise updating a carrier aggregation cell configuration tracked by the one or more base stations, in associated with the UE, in response to sending the cell swap instructions.

14. A user equipment (UE), comprising: one or more processors, and memory storing computer-executable instructions that, when executed by the one or more processors, cause the one or more processors to perform operations comprising:

connecting, via carrier aggregation, to a first cell and to a second cell provided by one or more base stations of a telecommunication network, wherein at a first time, the first cell is a primary cell (PCell) and the second cell is a secondary cell (SCell);

sending a power headroom report (PHR) to the one or more base stations, wherein the power headroom report indicates a PCell power headroom associated with the PCell and an SCell power headroom associated with the SCell;

sending, to the one or more base stations, one or more radio condition metrics that include at least one of one or more signal strength measurements or one or more signal quality measurements between the UE and the one or more base stations via at least one of the PCell or the SCell, wherein the one or more radio condition metrics are separate from the PHR;

receiving, in response to the PHR and based on sending the one or more radio condition metrics, cell swap instructions from the one or more base stations, wherein the cell swap instructions indicate that the UE is to use the second cell as the PCell and the first cell as the SCell for the carrier aggregation; and swapping, at a second time based on the cell swap instructions, to using the second cell as the PCell and the first cell as the SCell in association with the carrier aggregation.

15. The UE of claim 14, wherein the cell swap instructions are received as a Radio Resource Control (RRC) reconfiguration message.

16. The UE of claim 14, wherein the operations further comprise: measuring the PCell power headroom as a first remaining available transmission power associated with the first cell used as the PCell; and measuring the SCell power headroom as a second remaining available transmission power associated with the second cell used as the SCell.

17. The UE of claim 14, wherein: the UE connects to the first cell as the PCell via a first primary component carrier and to the second cell as the SCell via a first secondary component carrier, and in response to the cell swap instructions, the JE connects to the second cell as the PCell via a second primary component carrier and to the first cell as the SCell via a second secondary component carrier.

18. The UE of claim 17, further comprising receiving, from the one or more base stations, instructions to use a modulation and coding scheme (MCS) to increase throughput via the second primary component carrier, wherein the MCS is different from a previous MCS used in association with the first primary component carrier.

19. The UE of claim 14, wherein: the cell swap instructions are received from the one or more base stations further in response to the one or more radio condition metrics.

20. The UE of claim 14, wherein the carrier aggregation is at least one of uplink carrier aggregation or downlink carrier aggregation.

* * * * *